May 16, 1961 D. H. GRIDLEY ET AL 2,984,828

DIGITAL SYNCHRO DATA TRANSMISSION SYSTEM

Filed Dec. 29, 1950 2 Sheets-Sheet 1

INVENTORS
DARRIN H. GRIDLEY
MARVIN P. YOUNG

BY [signature]

ATTORNEYS

DIGITAL SYNCHRO DATA TRANSMISSION SYSTEM

Filed Dec. 29, 1950 2 Sheets-Sheet 2

INVENTORS
DARRIN H. GRIDLEY
MARVIN P. YOUNG

BY D. L. Snyder
Howard White
ATTORNEYS 2,984,828
Patented May 16, 1961

2,984,828

DIGITAL SYNCHRO DATA TRANSMISSION SYSTEM

Darrin H. Gridley, Washington, D.C., and Marvin P. Young, Alexandria, Va.

Filed Dec. 29, 1950, Ser. No. 203,464

5 Claims. (Cl. 340—204)

(Granted under Title 35, U.S. Code (1952), sec. 266)

This invention relates in general to telemetering systems.

More specifically this invention relates to a method and apparatus for providing a telemetering system operating through a follow up system wherein the communication link between the source of information and the information indicating means may be a radio, Teletype, or similar communications link.

The present invention is an improvement over the system disclosed in copending application Ser. No. 199,907, of Darrin H. Gridley, filed December 8, 1950, entitled "A Digital Synchro Data Transmission System."

The system disclosed in the above copending application relates to a system wherein the value of a given variable, such as the angular portion of a shaft, is transmitted to a remote location in the form of a binary code represented by the sequence and relative time position of a group of pulses. The pulses are stored in an electronic register having a number of stages equal to the number of code characters. The binary code is converted into a continuous group of pulses having a different phase for each code by means of a free running binary counter synchronized by reference pulses. More specifically, the code of the binary counter which is continuously changing is compared in a coincidence circuit with the code stored in the register and a pulse is generated whenever there is coincidence between the binary codes recorded by the counter and the register. This produces a continuous group of pulses at a phase depending on the code. The phase of the pulse output of the coincidence circuit is then compared in a phase comparator circuit with the phase of pulses representing the position of an indicating means such as a rotatable dial shaft and the indicating means is automatically moved to a position depending on the phase relation of the pulses fed to the phase comparator circuit.

In the system disclosed in the above cited copending application, to convert the stored code into pulses having a given phase determined by the code requires that the code by continually stored in the register. This system was not therefore very adaptable to a multiplex communication system where the values of difference variables could be telemetered over a single channel.

The present invention makes possible the use of a single register for all of the different variables transmitted over given communications link, and also appreciably simplifies the circuitry used for transmitting a single variable.

One object of the present invention is therefore to provide a digital synchro data system wherein the circuitry is substantially simplified over the system disclosed in the above cited copending application of Gridley.

Another object of the present invention is to provide a digital synchro data system wherein multiplexing techniques may be readily applied.

These and other objects of the present invention will become apparent to those skilled in the art from the specification and attached drawings wherein.

Basically the present invention comprises means for converting a received binary code signal into a signal pulse whose phase relative to a reference pulse varies with the received binary quantity. The apparatus for effecting the conversion comprises a binary counter in which the received code is first registered and a pulse generator for feeding pulses of a suitable frequency to the counter beginning with the instant at which a pulse is generated by a reference pulse generator. Then the time at which the counter registers or attains a given predetermined pulse count therefore varies with the received code. If when the counter reaches this given pulse count a pulse output results, then the phase of this pulse relative to the reference pulses produced by the reference pulse generator is an indication of the binary code which was stored. Then by means of a phase memory circuit, the phase of this single pulse is memorized as a continuous pulse train. This pulse train may then be compared with the phase of a train of pulses generated responsive to the position of a follower shaft or other information indicating means as disclosed in the Gridley application, supra and the follower or indicator means can be moved until the phase of the compared pulses reaches a given predetermined phase.

Figure 1:
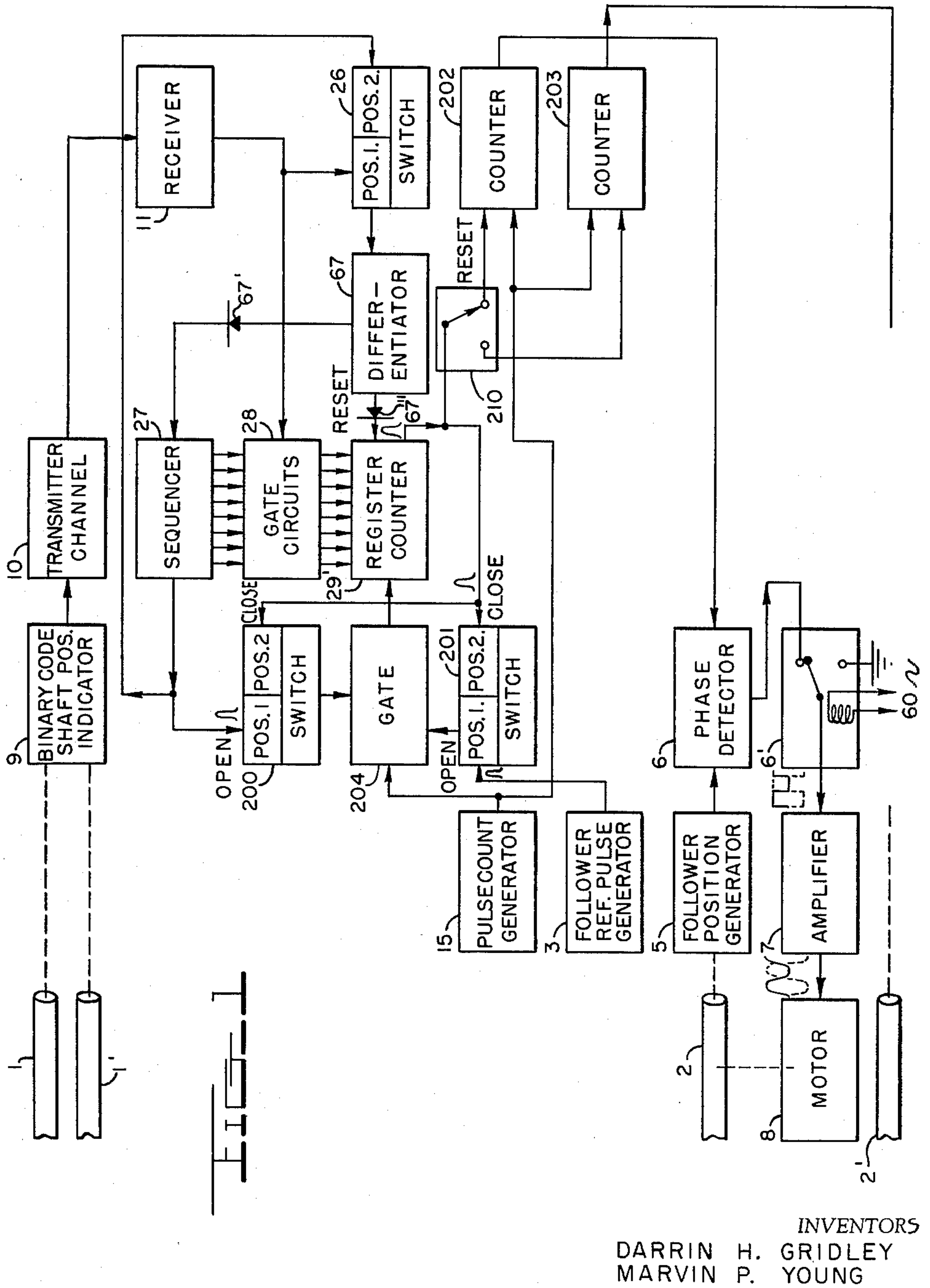
Figure 1 is a box diagram of the elements of the present invention.

Refer now to Figure 1, where the present invention is shown applied to a follow up system wherein the motion of a follower shaft 2 is to duplicate the position of director shaft 1. The position of director shaft 1 is indicated by a binary code indication produced by a code generator 9 coupled to shaft 1. The circuit details of this coded shaft position indicator 9 is disclosed in copending application Ser. No. 96,801, filed June 2, 1949, now United States Patent 2,680,241, entitled "Position Indicator Device," and also in the Gridley application, supra.

A transmitter channel 10 is coupled to the output of code generator 9 and includes a circuit for converting a stored binary code into a group of pulses whose sequence and time position duplicate the mark or space of the binary code. Thus if the code is 10110010, and 8 equal time intervals are considered of the transmitted wave, the 8 successive intervals would consist of the following pulse sequence: pulse—no pulse—pulse—pulse—no pulse—no pulse—pulse—no pulse. That is to say, the code character (1) is denoted by a pulse, and the code character (0) is denoted by the absence of a pulse.

The circuit details of the transmitter channel is disclosed in detail in the cited copending application entitled "A Digital Synchro Data Transmission System."

The pulses produced in transmitter channel 10 are coupled to a receiver 11 by means of a radio, Teletype, or similar communication link.

These transmitted pulses received by receiver 11 include a control pulse which precedes the code pulses so that a reference time for determining the intervals of the code group may be readily obtained.

This control pulse in the output of receiver 11 triggers switch 26 into a first switch position. (Switch 26 may be an Eccles-Jordan two stability position multivibrator of the well known variety. For example, see Figure 8 of the copending application on "A Digital Synchro Data Transmission System," previously cited.) By means of a conventional differentiator circuit 67 coupled to switch 26, the sudden change of voltage upon receipt of the control pulse, at the plate of one of the switch tubes of switch 26 is converted into a sharp pulse which is used to initiate sequencer 27, and reset the register counter 29' to zero count position. Differentiator 67 is thus coupled to sequencer 27 and register counter 29'.

Register counter 29' is in this embodiment a conventional eight stage electronic binary counter. A separate gate circuit included in circuit 28 is associated with each stage of counter 29' for reasons which will hereinafter be explained. (For circuit details of such a binary counter, see Figure 9 of the above-cited copending application.)

The incoming coded pulses are fed to the gate circuit 28 from the output of receiver 11 and are registered in the counter stage of register counter 29' (which is coupled to the output of gate circuit 28) corresponding to the code character being received by means of sequencer 27 coupled to gate circuit 28 which is a circuit for successively opening the gates associated with the stages of register counter 29' during the period which a corresponding code character is to be received. In this manner the binary register counter 29' is initially set to the binary code which the incoming pulses represent. (The circuit details of the gate and sequencer circuits, which are conventional, are disclosed in the last mentioned copending application.) Each stage of the register counter 29' taken alone is identical to the conventional Eccles-Jordan two stability trigger circuit used in register 29 of said copending application as shown in Figure 11 thereof as is conventional for binary electronic counter circuits. (It is to be noted, that similar reference characters in this and the copending application on "A Digital Synchro Data Transmission System" represent the same elements.)

After the sequencing operation is completed, a pulse is fed from the sequencer circuit 27 to trigger switch 26 into a second switch position. This is necessary since the proper polarity pulse for initiating sequencer 27 at the output of rectifiers 67' is obtained when switch 26 is switched from switch position 2 to switch position 1.

Figures 2, 3:
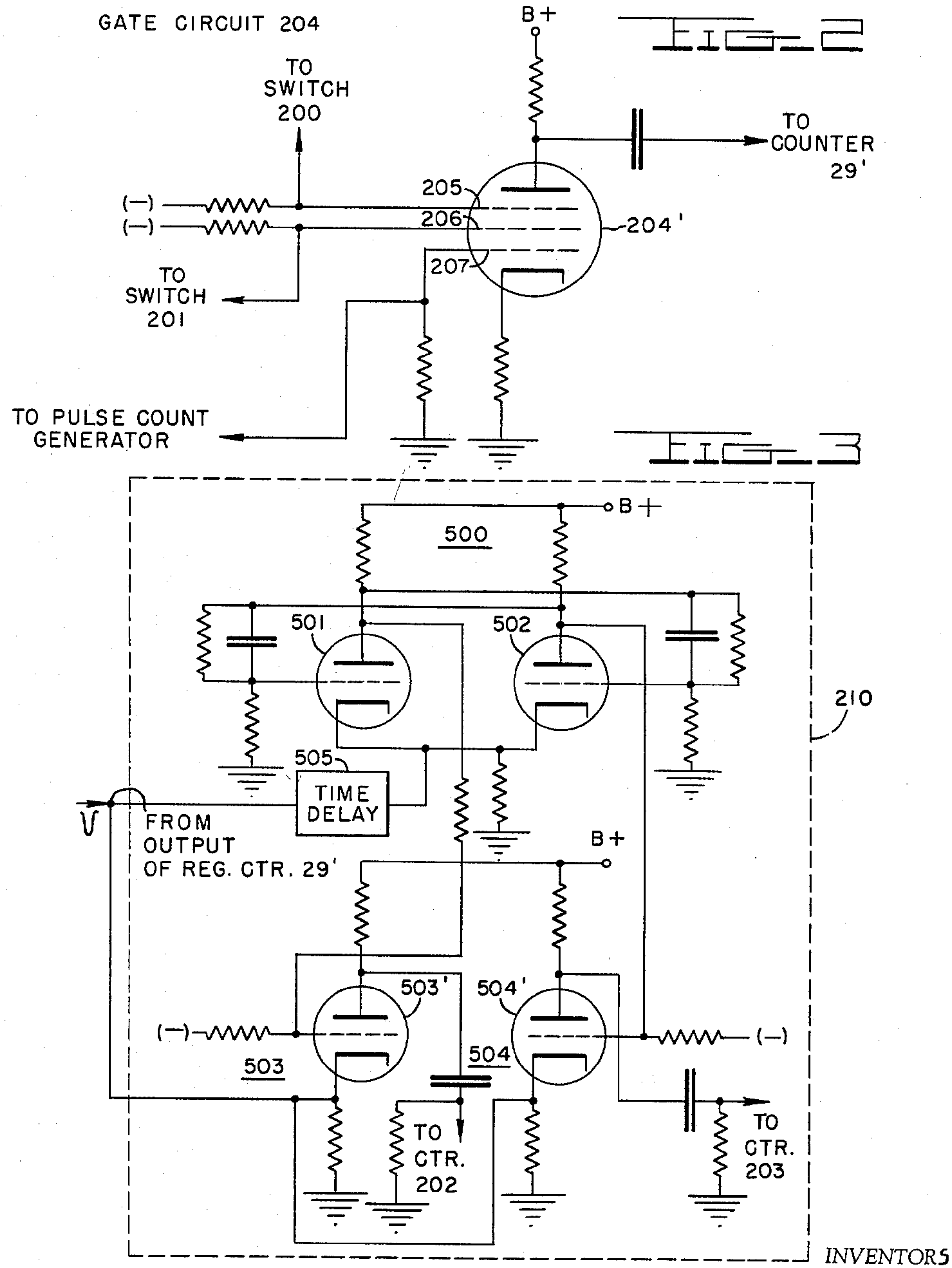
Figure 2 is a circuit diagram of gate circuit 204.
Figure 3 is a simplified circuit diagram of the electronic embodiment of switch 210 shown in Figure 1.

At the end of the sequencing period a pulse is also fed from the last stage of the sequencer 27 to trigger switch 200 into a switch position 1 so that pulses from a pulse generator 15 may be passed through a gate 204 to register counter 29' when switch 201 is triggered to switch position 1 by a pulse fed from reference generator 3. (Switches 200 and 201 are similar to switch 26 in being Eccles-Jordan two stability trigger circuits.) The square wave of voltage from one of the switch tubes of switch 200 is fed to a gate circuit 204, the circuit details of which are shown in Figure 2 so that when switch 200 is in switch position 1, a positive voltage will be fed to one of the control grids of the gate tube 204' of gate circuit 204 so as to render it operative to pass a signal if the gate voltage applied to one of the other control grids 206 of gate tube 204' is of proper value. Gate 204 is so designed that it will not pass a signal unless switch 200 and switch 201 both are in switch position 1. Switch 201 is in position 1 when it receives a reference pulse from the follower reference pulse generator 3. When the voltage applied to the gate 204 from switches 200 and 201 is positive so as to oppose the cutoff bias applied to grids 205 and 206 of the gate tube 204', then the signals applied to control grid 207 from a pulse count generator 15 will appear in the output (plate circuit) of gate tube 204'.

Pulse count generator 15 has a pulse repetition rate several times which is greater than the pulse repetition rate of reference generator 3 and follower position generator 5, the latter two generators having equal pulse repetition rates. More specifically, pulse count generator 15 generates as many pulses in one period of the pulse cycle of reference generator 3 as there are different coded groups of pulses representative of the given variable.

The signals in the output of gate 204 are fed to register counter 29' which counts these pulses. If counter 29' initially has registered a binary code representing the number 256, and counter 29' is an eight stage straight binary counter which counts therefore up to 256 ($2^8=256$), the last stage of counter 29' will not be triggered into its condition at zero count position until 256 pulses after gate 204 was opened. (Gate 204 is opened in synchronism with the pulses from reference generator 3.) By means of a differentiator circuit and rectifier circuit (not shown) similar to circuits 67 and 67', the sudden change of the voltage on the last stage of counter 29' is converted into a pulse which triggers switches 200 and 201 into switch position 2 thereby closing gate 204. This pulse is also applied to a phase memory circuit comprising another counter 202 which may be a conventional blocking oscillator frequency divider such as shown on page 595, volume 19, entitled "Waveforms," of the M.I.T. Radiation Laboratory Series, 1949 edition. This pulse output of the register counter circuit 29' is used to reset counter 202 or 203 to zero count position. Zero count position in the blocking oscillator type frequency divider or counter referred to above occurs when the blocking oscillator is triggered into a conductive state. The amplitude of the pulse fed from register counter 29' to trigger the blocking oscillator 202 into conduction must therefore be greater than the amplitude of the pulses fed to the blocking oscillator from pulse count generator 15. A pulse of current is thus produced in the output of the blocking oscillator which is in synchronism with the triggering pulse from register 29'. Since the pulse count generator is continually feeding pulses to the frequency divider or counter 202, a continuous series of pulses are produced in the output of the blocking oscillator frequency divider 202 whose phase or time position has been controlled by a single pulse in the output of register counter 29'.

If the frequency of pulse count generator 15 is $f_2$ pulses per second, and that of follower and reference pulse generator 3 and 5 respectively is $f_1$ pulses per second, then counter or frequency divider 202 is made to count up to or divide by $f_2/f_1$ so that a pulse is delivered in its output every $f_2/f_1$ pulses. The rate of the pulses in the output of counter 202 will be $f_1$ pulses per second. It should be evident that the pulses at the output of frequency divider or counter 202 will have the same phase relative to frequency $f_1$ as that of the reset pulse which was fed thereto from register counter 29'. The phase of these pulses at the output of divider 202 are thus determined by the binary code transmitted by the system at the director location.

The output of counter 202 is fed to phase detector 6 where the phase of these pulses are compared with other pulses generated by follower generator 5 having a phase indicative of the position of follower shaft 2. The phase relation of the pulses fed to detector 6 controls the operation of motor 8 which positions follower shaft 2.

Accordingly, a follower position generator 5 is coupled to follower shaft 2 and gives a pulse output at a rate $f_1$ and variable in phase proportional to the position of follower 2. These pulses and those at the output of counter 202 are fed to a phase detector 6 which produces a direct current voltage output proportional to the magnitude and sense of the difference of the phase of the pulses fed thereto. Any suitable pulse phase detectors known in the art may be used for phase detector 6 which gives a zero output voltage for one given phase relation. (For example, see the phase detector circuit disclosed in copending application Ser. No. 199,907.)

It will be appreciated that for the follow up system to properly operate, the binary code produced by code position indicator 9 should be such that as shaft 1 is gradually changed from position to position that the code delivered thereby will gradually change in the same manner in which binary counter 29' changes as pulses are fed thereto.

The direct current voltage output of phase detector 6 is fed to a vibrator 6' which converts the direct current into a square wave of voltage at a suitable frequency to operate motor 8. An amplifier 7 is designed to have a low frequency response so that voltage in its output is sinusoidal in shape at the fundamental frequency of the aforementioned square wave.

Motor 8 when energized from amplifier 7 moves shaft 2.

It should be noted that register counter 29' is a binary type counter whereas counter 202 may be any suitable type since in effect it is merely a frequency divider which produces a pulse output after so many pulses have been fed thereto from a zero count position.

If the position of two director shafts 1—1' are to be duplicated by respective follower shafts 2—2', then the transmitter channel 10 will successively transmit two different coded pulse groups representing respectively the position of shafts 1 and 1'. A pulse representing the position of director shaft 1 will be produced by register counter 29' in the manner described from the code group representing the position of director shaft 1 stored in register counter 29'. This pulse is fed through a switch 210 to counter 202 to set up a group of pulses having a phase dependent on the time occurrence of said output pulse which controls the position of follower shaft 2 in the manner previously described.

The last mentioned output pulse is given an added function of initiating a switching operation which occurs a short time after the occurrence of the pulse by causing switch 210 to be positioned into switch position 2 where the next output pulse from register counter 29' will be coupled to a second counter or divider 203 which is similar in circuitry and function to counter 202. The next output pulse occurs as a result of the registering of the coded group of pulses representing the position of shaft 1' and causes a continuous group of pulses to appear in the output of counter 203 having a phase dependent on the time position of the output pulse from register counter 29' in the manner explained in connection with counter 202. These pulses control the position of follower shaft 2' by means of circuitry (not shown in Figure 1) equivalent to that used to position shaft 2.

The pulse output of register counter 29' resulting from the code representing the position of director shaft 1' initiates a switching operation a short interval later by which switch 210 is placed in a switch position corresponding to the group of pulses next to be received. If only two director shafts positions are to be duplicated, then switch 210 is positioned back to switch position 1 where the output of register counter 29' will be coupled to counter 202.

Refer now to Figure 3 where the electronic equivalent of switch 210 is shown. The circuit there shown includes a conventional two stability trigger circuit 500 which controls the conductive state of two gate amplifiers 503—504. Trigger circuit 500 is of the type where the conduction of either control tube 501 or 502 renders the other tube non-conductive. A trigger pulse fed to the cathodes (or control grids) of the control tubes 501—502 changes the state of conduction of both tubes. The plate voltage of the control tube conducting plate current is of course at a lower positive potential than the non-conducting tube. The voltage at the plates of tubes 501—502 are coupled to the control grids of respective gate tubes 503'—504'. The gate tubes 503'—504' are held non-conducting by a negative bias voltage fed to both grid circuits and remain so unless pulses are fed to the cathode circuits from counter register 29' and the control tube of the trigger circuit stage 500 to which the respective gate tubes are coupled is in a non-conductive state. The positive voltage on the plates of the control tubes 501—502 thus controls the presence of pulses at the output of gate tubes 503'—504'. The triggering pulses for the trigger circuit 500 are delayed by a conventional time delay circuit 505 for a short interval so that the pulse fed to the gate tube which was open to pass pulses fed thereto before the occurrence of the pulse output from register counter 29' will appear only in the output of the latter gate tube.

It should be understood that the circuit of Figure 3 just described is exemplary only and other suitable circuits may be used without deviating from the scope of the present invention.

Except for switches 200, 210 and 201, and counters 29', 202, and 203, the identical circuit elements shown in Figure 1 are all present in the copending application previously cited on "A Digital Synchro Data Transmission System," by Darrin H. Gridley.

Substantially all of the elements shown in Figure 1 are well known in the art, the invention being in the novel combination thereof.

Many other modifications may be made of the specific embodiments herein disclosed without deviating from the scope of the present invention.

The invention described herein may be manufactured and used by or for the Government of the United States of America for Governmental purposes without the payment of any royalties thereon or therefor.

What is claimed is:

1. In a digital synchro data transmission system where information is transmitted in the form of a binary coded group of pulses, the combination of a first binary counter means operative to produce a pulse output after a given pulse count is registered therein, a first means for initially setting said binary counter to the count represented by said coded group of pulses, a first pulse source for generating pulses of a fixed phase at a repetition rate $f_2$, gating means coupled between said first pulse source and said binary counting means, a second pulse source having a pulse repetition rate $f_1$ of fixed reference phase which is less than $f_2$, second means coupled between said second source of pulses and said gating means to render same operative to couple pulses from said first pulse source to said counting means in isochronism with the pulses from said second source of pulses after said coded group of pulses is initially registered in said binary counting means, third means coupled to the output of said counting means to produce a continuous group of pulses having a pulse repetition rate $f_1$ and a phase characteristic of the phase of the pulse output of said binary counting means, a movable indicating means, a fourth means coupled to said indicating means for producing pulses at a rate $f_1$ having a phase with respect to said reference phase proportional to the position of said movable indicating means, pulse phase responsive means coupled to the output of said third and fourth pulses operative to move said indicating means whenever the phase relation of the pulses fed thereto differ from a given predetermined phase relation.

2. In a digital synchro data transmission system where information is transmitted in the form of a binary coded group of pulses, the combination of a first binary counter means operative to produce a pulse output after a given pulse count is registered therein, a first means for initially setting said binary counter to the count represented by said coded group of pulses, a first pulse source for generating pulses of a fixed phase at a repetition rate $f_2$, gating means coupled between said first pulse source and said binary counting means, a second pulse source having a pulse repetition rate $f_1$ of fixed phase which is less than $f_2$, second means coupled between said second source of pulses and said gating means to render same operative to couple pulses from said first pulse source to said counting in isochronism with the pulses from said second source of pulses after said coded group of pulses is initially registered in said binary counting means, second pulse counting means operative to produce an output pulse every $f_2/f_1$ pulses, third means coupling the output of said first binary counting means to said second counting means for rendering said second counting means operative to count from zero count position in synchronism with the pulses fed thereto from the output of said first binary counting means, means continually coupling said first source of pulses to said second counting means whereby the pulses produced thereby may be counted, a movable indicating means, fourth means coupled to said indicating means for producing pulses at a rate $f_1$ having a phase with respect to the reference phase of said second pulse source which is proportional to the position of said movable means, pulse phase responsive means coupled to the output of said second counting means and said fourth means operative to move said indicating means whenever the phase relation of the pulses fed thereto differs from a given predetermined phase relation.

3. The combination of a first counting means operative to produce a pulse output after a given pulse count is registered therein, means for first initially setting said counter to a count position representing the value of a given variable, a first pulse source for generating pulses at a rate $f_2$, a second pulse source for generating pulses of reference phase at a rate $f_1$, which is less than $f_2$, second means coupled between the output of said second pulse source and said pulse counting means operative to couple the pulses from said first pulse source to said counting means said second means including initiating means responsive to the successive occurrence first of the initial registration of said coded group of pulses and then of the beginning of said pulses from said first pulse source, third means coupled to the output of said first counting means operative to produce a continuous group of pulses at the same phase with respect to said reference phase as a pulse in the output of said first counting means plus phase indicating means adapted to indicate the phase of the output of said third means with respect to a selected reference phase.

4. The combination of a first counting means operative to produce a pulse output after a given pulse count is registered therein, means for first initially setting said counter to a count position representing the value of a given variable, a first pulse source for generating pulses at a rate $f_2$, a second pulse source for generating pulses of reference phase at a rate $f_1$, which is less than $f_2$, second means coupled between the output of said second pulse source and said pulse counting means operative to couple the pulses from said first pulse source to said counting means said second means including initiating means responsive to the successive occurrence first of the initial registration of said coded group of pulses and then of the beginning of said pulses from said first pulse source, second pulse counting means operative to produce an output pulse every $f_2/f_1$ pulses, third means coupling the output of said first counting means to said second counting means for rendering same operative to count from zero count position in synchronism with the pulse output of said first counting means, means continually coupling said first source of pulses to said second counting means plus phase indicating means adapted to indicate the phase of the output of said third means with respect to said reference phase.

5. In a system which includes a means for representing a given variable in the form of a binary code, the combination comprising a first counting circuit operative to produce an output pulse after a given pulse count is registered therein, first means for initially setting said first counting circuit to a count position representative of the binary code indicating the value of said given variable, a reference pulse source, second means operative to feed pulses at a given predetermined rate to said counting circuit to be counted thereby, said second means including initiating means responsive to a reference pulse from said reference pulse source, plus phase indicating means adapted to indicate the relative time position with respect to said reference pulse source of the pulse produced by said counting circuit when said given pulse count is registered thereby.

References Cited in the file of this patent

UNITED STATES PATENTS

| | | |
|---|---|---|
| 2,276,665 | McDavitt | Mar. 17, 1942 |
| 2,537,427 | Seid et al. | Jan. 9, 1951 |
| 2,567,862 | Van Voorhis | Sept. 11, 1951 |

OTHER REFERENCES

Publication "Electronics," March 1947; pages 120–123.